Oct. 17, 1967
H. N. WAGAR
3,348,075
CIRCUIT IDENTIFIER
Filed July 22, 1964
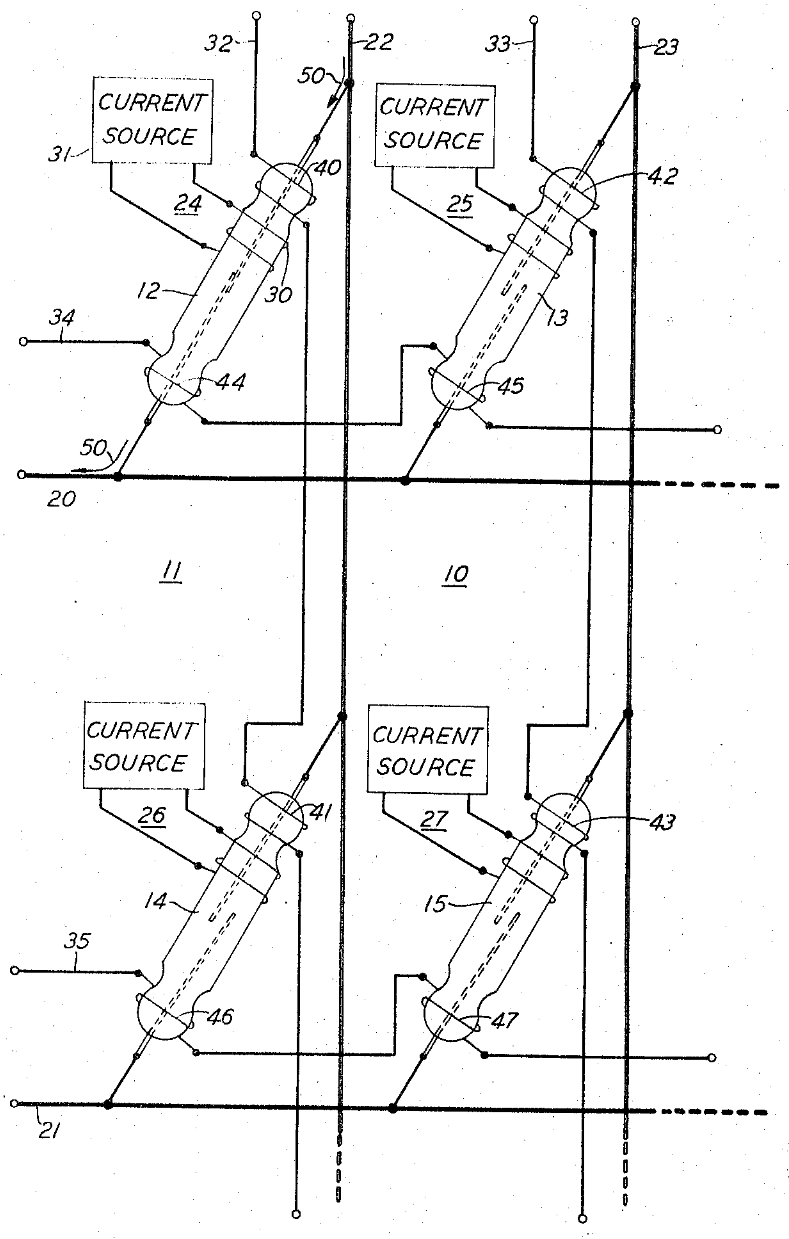
INVENTOR
H. N. WAGAR
BY
Harry L. Newman
ATTORNEY United States Patent Office 3,348,075

Patented Oct. 17, 1967

3,348,075

CIRCUIT IDENTIFIER

Harold N. Wagar, Madison, N.J., assignor to Bell Telephone Laboratories, Incorporated, New York, N.Y., a corporation of New York Filed July 22, 1964, Ser. No. 384,466
8 Claims. (Cl. 307—113)

ABSTRACT OF THE DISCLOSURE

A switching device is disclosed in which vertical and horizontal conductors of a matrix are interconnected at crosspoints by magnetically responsive switches and in which the state of operation of each crosspoint is detected by an identifier.

This invention relates generally to detecting arrangements for use in switching systems and more particularly relates to arrangements for identifying operated electrical circuits in such systems.

One way of identifying operated electrical circuits is by detecting operated intermediate or interconnecting switching points therein. A switching point is a place in an electrical circuit where current can be selectively interrupted or allowed to flow. By various combinations of switching points, highly complex switching systems can be assembled. One such is the telephone system.

In telephone systems, the contacts of electromechanical relays are commonly used for switching points. For example, in one widely used relay, dozens of contacts are arranged for interconnecting telephone calls on incoming circuits in a central office to outgoing circuits that lead ultimately to called parties.

Switching flexibility is achieved by associating each incoming circuit with multiple outgoing circuits through multiple switching points. As a result, each incoming circuit can be connected to any one of a number of outgoing circuits. In a similar manner, each outgoing circuit can accommodate any one of a number of incoming circuits.

A relay for interconnecting incoming and outgoing circuits through switching points is illustrated in Patent No. 2,999,140 issued to C. R. J. Dumousseau et al. on Sept. 5, 1961. In that patent, sealed contact reed switches are used for switching points and the switches are arranged in horizontal rows and vertical columns.

All of the reed switches in each row are strapped together at one end in a common connection or row bus. Similarly, all of the reed switches in every column are strapped together at one end in a common connection or column bus. In the latter, however, the switch end strapped in the column bus is opposite to the switch end strapped in the row bus. As a result, an incoming circuit terminated on a column bus can be interconnected to the outgoing circuit terminated on any row bus merely by operating a selected reed switch.

In switching systems using relays of the type described, connections between incoming and outgoing circuits must be carefully regulated. In particular, some method is needed in order to insure that only one incoming circuit is connected through a switching point to any one outgoing circuit at any given time.

Heretofore, relays for interconnecting incoming and outgoing circuits have been equipped with an auxiliary contact for each contact used as a switching point. The auxiliary contact comprises part of a control circuit used to identify the interconnected incoming and outgoing circuits.

In at least one known arrangement, the switching point and the auxiliary contact are activated by a common motor. When the motor operates, the switching point and the auxiliary contact close. The closure of the auxiliary contact actuates a control circuit associated with the incoming and outgoing circuits interconnected by the switching point. As a result, identification and regulation of the interconnected incoming and outgoing circuits is readily made. While this method is satisfactory for many applications, it requires two contacts in order to identify the operation of each switching point.

Where reed switches are used for switching points, however, the necessity for two contacts per switching point is intolerable. Such a requirement reduces by one-half the capacity of a relay such as that illustrated in the aforesaid Patent 2,999,140. As a result, it is advantageous to be able to identify interconnected circuits without the use of an auxiliary contact.

It is therefore an object of this invention to identify interconnected circuits.

It is another object of this invention to identify an operated circuit in a switching matrix by the use of a single contact.

It is still another object of this invention to identify an operated reed switch in a crosspoint switch.

According to this invention, a switching device is combined with an identifier. The switching device comprises a plurality of conductors and a plurality of flux responsive switches. The conductors are arranged to form crossover points therebetween and a flux responsive switch is located at each crossover point. The identifier identifies interconnected conductors when a switch energized by an operative flux makes the interconnection. Identification occurs in response to changes in the operative flux produced by an annular magnetic flux developed by current flowing through the energized switch.

According to one feature of this invention, the identifier comprises a plurality of detectors wherein each detector includes a plurality of serially connected coils. Each of the coils is combined with a coil from another detector into a coil pair. The coil pair is arranged to inductively respond to changes in an operative flux energizing a switch disposed at a crossover point.

Other objects and features of this invention are readily apparent from a reading of the specification when taken in conjunction with the drawing in which a switching device is shown in combination with an identifier.

In the drawing, the switching device is labeled 10 and the identifier is labeled 11. The switching device 10 comprises four sealed contact reed switches 12, 13, 14, and 15 and four conductors or buses 20, 21, 22 and 23. In the embodiment shown, the conductors and switches are arranged in a matrix.

Each of the reed switches 12, 13, 14 and 15 contains a pair of electrically conducting contacts or reeds spaced apart and overlapped at their tips. At least one of the contacts is magnetic. Advantageously, the contacts of each switch are normally open. Moreover, they are arranged to close in response to magnetic flux. Such switches are readily available commercially.

Each of the busses 20, 21, 22 and 23 is made of an electrically conducting material such as copper. The buses 20 and 21 are row buses while the buses 22 and 23 are column buses. The row and column buses are arranged to overlap each other to form crossover points therebetween.

As shown in the drawing, the column bus 22 joins one end of the switches 12 and 14 in a common connection, and the column bus 23 joins one end of the switches 13 and 15 in a common connection. Moreover, the row bus 20 joins the other end of the switches 12 and 13 in a common connection, and the row bus 21 joins the other end of the switches 14 and 15 in a common connection.

With the switches and buses connected as described, an incoming circuit terminated on the column bus 22 can be interconnected to an outgoing circuit terminated on either row bus 20 or 21 by operating either switch 12 or 14, respectively. Similarly, an incoming circuit terminated on the column bus 23 can also be interconnected to an outgoing circuit terminated on either the row bus 20 or 21 by operating either switch 13 or 15, respectively.

Each switch in the switching device 10 is advantageously equipped with a separate operator or energizer for making the foregoing interconnections. For example, as shown in the drawing, each switch 12, 13, 14 and 15 is equipped with an energizer 24, 25, 26 and 27, respectively. When activated, each energizer operates the switch with which it is associated by establishing a magnetic field or operative flux that serially traverses the contacts and the air gap in the switch.

In one convenient form, each energizer comprises a coil and a source of electrical current. The coil is wound around its associated switch and the source of electrical current is connected to the oil terminals in order to supply current thereto in response to an external signal. In operation, all of the energizers perform identically. Therefore, a detailed description of the operation of one suffices for all.

As shown in the drawing, the energizer 24 is associated with the switch 12. The energizer 24 comprises a coil 30 and a current source 31. The current source 31 is connected to the coil 30 and supplies current thereto in response to a signal not shown. When a current flows in the coil 30, an operative magnetic flux is developed in the switch 12 and the contacts close. As a result, the column bus 22 is interconnected through a switching point to the row bus 20.

The identifier 11 shown in the drawing comprises two column detectors 32 and 33 and two row detectors 34 and 35. Each detector, whether row or column, comprises a plurality of serially connected detector coils. For example, as shown in the drawing, the column detector 32 includes two detector coils 40 and 41, and the column detector 33 contains two detector coils 42 and 43. Similarly, the row detector 34 includes two detector coils 44 and 45, and the row detector 35 includes two detector coils 46 and 47. Each detector coil is wound on a switch in such a manner that a change in magnetic flux serially traversing the reeds in the switch will induce an electrical potential therein.

As shown in the drawing, the column detectors 32 and 33 are conveniently disposed in coextensive relationship with the column buses 22 and 23, respectively. Similarly, the row detectors 34 and 35 are arranged coextensively with the row buses 20 and 21, respectively.

In operation, the identifier 11 identifies the row and column buses interconnected by an operated switch. For example, when the switch 12 is energized as hereinbefore described, the identifier 11 pinpoints the column bus 22 and the row bus 20 as the interconnected conductors.

The identifier 11 operates in response to changes in the operative flux holding the switch 12 closed. When the switch 12 is closed as shown in the drawing, the current 50, from a source not shown, flows serially through the contacts. The current 50 is illustrated in the drawing by an arrow. When the current 50 flows, an annular magnetic flux (not shown) is established. The annular magnetic flux interacts with the operative magnetic flux holding the contacts together in the switch 12. This interaction results in a reduction in the magnitude of the operative magnetic flux. As the operative magnetic flux is reduced, an electrical potential or pulse is induced in the detector coils 40 and 44 and transmitted through the detectors 32 and 34, respectively. Thus, an output appearing in the detector 34 identifies the row bus 20 as one interconnected conductor and an output appearing in the detector 32 identifies the column bus 22 as the other interconnected conductor.

The identification of interconnected row and column buses described above occurs when current first flows through the switch 12. Identification, however, can be made at other times as well. Any change in the current 50 will energize the identifier 11. For example, a pulse or pulses, such as a 10 kc. spurt, superimposed over the signal current in any operated switch will produce response similar to those described above.

Accordingly, there has been disclosed herein an invention comprising a switching device and an identifier. The switching device is made up of conductors connectable by switches and the identifier identifies interconnected conductors by using flux interactions occurring in current carrying conductor interconnecting contacts. Identification, moreover ocurs only when a signal is atually passing through the operated contacts. It will be noted, however, that the embodiment disclosed herein is illustrative of the principle of the invention only and many other modifications and arrangements within the scope of this invention can readily be achieved by those skilled in the art.

What is claimed is:

1. In a switching device the combination comprising:
a plurality of electrical conductors;
a plurality of switches for interconnecting said conductors, each of said switches including a source of operative magnetic flux and a pair of normally open contacts, each pair of contacts being adapted to close in response to the application of operative magnetic flux from said source, to conduct an electrical current between conductors when closed, and to conduct an annular magnetic flux induced by said electrical current; and
identifier means for identifying the state of connection between electrical conductors, said identifier means being adapted to respond to flux changes produced by interaction between said operative magnetic flux and said annular magnetic flux.

2. In a switching device the combination comprising:
operative magnetic flux supplying means;
electrically conducting first means;
electrically conducting second means disposed generally perpendicular to said first means;
a plurality of normally opened, flux responsive contact pairs, each of said contact pairs being arranged to close in the presence of operative magnetic flux, to conduct an electrical current between portions of said first means and said second means and to conduct an annular magnetic flux induced by the flow of said electrical current;
means for applying operative magnetic flux to selected contact pairs; and
identifier means for identifying the state of connection between portions of said first and second means interconnected by said selected contact pair, said identifier means being responsive to flux changes produced by interaction in said selected contact pair between said operative magnetic flux and said annular magnetic flux.

3. The combination in accordance with claim 2 wherein said identifier means comprises a plurality of coil pairs wherein both coils in each pair are inductively coupled to a contact pair and one coil is an element in a conductor associated with said first means and said second coil is an element in a conductor associated with said second means.

4. In a switching device the combination comprising:
electrically conducting means arranged in substantially column and row formation;
a plurality of switches for electrically interconnecting row and column portions of said electrically conducting means, each of said switches including a source of operative magnetic flux and a pair of overlapping magnetic contacts sealed in a vessel, said contacts being arranged to close in response to the application of operative magnetic flux from said source, to conduct an electrical current and to conduct an annular magnetic flux induced when said electrical current flows; and an identifier for indicating the state of connection between interconnected portions of said electrically conducting means, said identifier comprising a plurality of detectors wherein each detector includes a plurality of serially connected coils individually coupled to separate switches and arranged to inductively respond to flux changes produced in said separate switches by the interaction between said operative magnetic flux and said annular magnetic flux.

5. In a switching device the combination comprising:

a plurality of electrically conducting first members;

a plurality of electrically conducting second members associated with said first members to form crossover points; and switching means for interconnecting a first member to a second member at each crossover point, said switching means including contact means, identifier means and means for supplying an operative magnetic flux to said contact means, said contact means being arranged to close in the presence of operative magnetic flux, to conduct an electrical current between first and second members when closed and to conduct an annular magnetic flux induced when said current flows between said first and second members, and said identifier means being arranged to identify first and second members interconnected through said contact means in response to flux changes produced in said contact means by the interaction between said operative magnetic flux and said annular magnetic flux.

6. In a switching device the combination comprising:

a plurality of first electrical conductors;

a plurality of second electrical conductors superimposed over said first electrical conductors to form switching points; and switching means for interconnecting a first electrical conductor to a second electrical conductor at each switching point, said switching means including a vessel, a coil wound on said vessel for producing an operative magnetic flux, a pair of normally open contacts closable by said operative magnetic flux and a pair of detector coils, said normally open contacts being sealed in said vessel and arranged to conduct an electrical current between said first electrical conductor and said second electrical conductor when closed and being adapted to conduct an annular magnetic flux induced by the flow of said electrical current, and said pair of detector coils being arranged to inductively respond to flux changes produced in said contacts by the interaction between said operative magnetic flux and said annular magnetic flux.

7. In a switching device the combination comprising:

a pair of first conductors;

a pair of second conductors superimposed over said first conductors to form crossover points therebetween;

a sealed contact reed switch disposed at each crossover point with one end connected to a first conductor and the other end connected to a second conductor;

a source of operative magnetic flux disposed adjacent to each sealed contact reed switch;

a pair of first detectors disposed adjacent to said pair of first conductors;

a pair of second detectors disposed adjacent to said pair of second conductors; and a coil pair disposed at each crossover point with one coil thereof wound on one end of said sealed contact reed switch and serially connected in a first detector, and the other coil thereof wound on the other end of said sealed contact and serially connected in a second detector.

8. In a switching device operated by magnetic flux the combination comprising:

a plurality of conductors;

a plurality of switches for interconnecting said conductors wherein each switch closes in response to the application of an operative magnetic flux, is adapted to conduct an electric current when closed and to conduct an annular magnetic flux, said annular magnetic flux being induced by the flow of said electric current; and a plurality of serially connected coils wound on said switches for identifying interconnected conductors by inductively responding to flux changes produced in said switches by the interaction between said operative magnetic flux and said annular magnetic flux.

References Cited

UNITED STATES PATENTS

| | | | |
|---|---|---|---|
| 2,827,625 | 3/1958 | Greenblott | 340—253 X |
| 2,872,544 | 2/1959 | Hoffman. | |
| 2,975,297 | 3/1961 | O'Neil | 307—115 X |
| 2,999,140 | 9/1961 | Dumousseau et al. | 335—136 |
| 3,134,908 | 5/1964 | Ellwood | 317—155.5 X |
| 3,226,604 | 12/1965 | Dreyfus-Alain | 317—155.5 X |
| 3,252,083 | 5/1966 | Wagar | 324—28 |

ORIS L. RADER, *Primary Examiner.*

T. B. JOIKE, *Assistant Examiner.*